Patented May 4, 1954

2,677,613

UNITED STATES PATENT OFFICE 2,677,613

PROCESS OF MAKING QUICK-COOKING ALIMENTARY PASTE

Chynduog D. Shiah, New York, N. Y.

No Drawing. Application May 8, 1950, Serial No. 160,825

3 Claims. (Cl. 99—85)

This invention relates to food products and is more particularly concerned with food products of the alimentary paste type such as represented by macaroni, spaghetti, noodles, vermicelli, and the like.

Food products of the character indicated are not cooked during manufacture but are generally prepared by moistening a semolina flour or the like with water, forming the resulting paste into desired shapes and then air drying in large drying rooms or in ovens to a low moisture content. The dried product is then cut, if necessary, and packaged without further treatment.

To prepare the dried product for consumption it is necessary to cook it, as by boiling in water, in order to tenderize it and make it palatable. Ordinarily, a considerable amount of cooking is required to reduce the hard, dried product to an edible consistency.

There have been various proposals for making a quick-cooking product but these proposals have not been entirely satisfactory for various reasons. It has been proposed, for example, to form the products of the spaghetti and macaroni types with thin-walled tubular sections instead of the relatively thick-walled sections found in products made by conventional practice, the theory being that the thinner the walls of the tubular sections the quicker and more thoroughly they will cook. It has been found in practice, however, that the thin walls have a strong tendency to collapse when boiled in water in accordance with usual cooking methods. When the walls collapse during cooking not only does the food present a somewhat non-appetizing mass but collapse of the walls hinders the contact of the cooking medium, juices, seasoning, etc. with the interior walls. It is highly desirable, therefore, that collapse of the tubular walls be prevented. Merely making the walls thin is thus not a practical solution to the problem of making the products quick-cooking. It has also been proposed to incorporate strengthening materials in the product during its manufacture to prevent the sagging and collapsing of the thin side walls. The strengthening materials which have been proposed are, however, relatively expensive and materially increase the cost of manufacture. Since spaghetti, macaroni and the like are widely used as a low-cost food of high nutritive value, an expedient which takes this food out of the low-cost category is obviously not desirable. Furthermore, while the foregoing proposals are applicable to tubular products such as spaghetti and macaroni, they are of little value for preparing quick-cooking non-tubular alimentary products such as noodles and vermicelli.

It is the principal object of the invention to provide an improved quick-cooking alimentary paste product.

It is a further object of the invention to provide a food product of the character indicated which is quick-cooking but which retains its form during cooking.

It is another object of the invention to provide a quick-cooking alimentary paste product which does not require the addition of expensive ingredients to impart the quick-cooking characteristics to the product.

It is another object of the invention to provide a process of making a quick-cooking alimentary paste product without the disadvantages of known processes.

Other objects and features of the invention will become apparent as the description proceeds.

According to the invention, I prepare a formed alimentary paste product which is characterized by a plurality of minute voids distributed throughout the body portion of the product. The product may be formed with a nominal wall thickness as great or greater than that of conventional alimentary paste products but permits maximum penetration of heat and cooking juices whereby complete cooking can be effected in a fraction of the time customarily required by conventional products. Notwithstanding ready permeability of the product to heat and liquid, it retains its shape, even when in tubular form. The process for making the product of the invention comprises the steps of incorporating a small amount of baking powder, yeast or other leavening agent into the moist dough, allowing the dough to stand in a warm place until a substantial increase in volume has taken place or until the desired number of voids appear, forming the dough into the desired shape, steaming with saturated steam and then drying. The product is relatively hard but the minute voids are clearly visible and it can be cooked to any desired degree of tenderness in a very short time.

In preparing my quick-cooking product I employ water, wheat flour, e. g., semolina flour, and baking powder, yeast or other leaven. I may also include other ingredients such as milk, shortening, salt, sugar, and the like depending upon the particular taste desired in the final product. In making egg noodles, for example, I incorporate eggs, either in raw or powdered form. In a preferred form of the invention I prepare a particularly desirable product by incorporating a small amount of a modified starch, for example the products designated "B-24" and "A-22" and manufactured by General Mills Corporation. I incorporate up to 15%, preferably 5 to 15%, based on the weight of the flour. While, as I have stated, other ingredients may be incorporated, the flour should represent at least 60% of the total weight of the ingredients other than water.

The quantity of yeast, baking powder or other leaven may vary but generally should be between 5 and 10% based on the weight of the flour. Generally speaking, the leaven should be sufficient to double the volume of the moist mixture within two hours when the mixture is allowed to stand at a temperature of 10° to 40° C.

In preparing my quick-cooking alimentary paste product I first mix the ingredients dry, i. e. I mix the flour, the leaven, and the other ingredients other than water. The water is then added gradually until a dough of convenient working consistency is obtained. When liquid milk is to be used it is conveniently added along with the water. The quantity of water necessary will vary depending upon the nature of the various ingredients in the mixture but as a general rule a quantity of water approximately equal to the weight of the dry ingredients is found suitable. Too little water will interfere with the later handling and forming of the dough while too much water will make necessary the removal of excess quantities of moisture in the subsequent drying step.

After the ingredients have been mixed and water incorporated to give a plastic, workable dough, the mass is set aside in a moist, warm location until it has increased in volume by 50% to 200%, preferably 100%, which generally requires from thirty minutes to three hours. The voids represent between about ⅓ and ⅔ of the mass, and preferably a dough containing 50% voids is prepared. During the raising step the relative humidity is advantageously between 45% and 100%, preferably 75% to 100%, and the temperature is 10° to 40° C., preferably 30° to 40° C.

After the dough has increased in volume to the desired extent it is kneaded by any convenient means, as in the well known bakery dough mixer. The kneaded dough is then dusted and rolled or extruded to form the desired shape.

The dough is shaped by means of apparatus commonly used in the manufacture of alimentary paste products. For example, the dough may be forced out through dies by hydraulic pressure in string-like form, i. e. as vermicelli, or in the tubular form of macaroni and spaghetti. To form noodles and like products the dough may be rolled into sheet form and then cut into strips of desired size. The forming of the dough into a particular shape is in itself not a part of my invention and may be done by any convenient means.

After the dough has been formed into the desired shapes it is steamed with saturated steam for 3 to 5 minutes and is then dried. Drying may be effected by mere exposure to the air in a drying room in accordance with usual practice or drying may be carried out in a hot air dryer. The temperature of the drying air is advantageously 40 to 60° C. and drying is carried out until the moisture content of the product has been reduced to 10 to 14%. The product may then be cut to any desired size and packaged.

To cook, it is merely necessary to cover the product with water, heat to boiling, boil one minute and then let stand for 5 to 10 minutes. The variation in standing time depends upon the tenderness desired, i. e. in accordance with the individual taste. Various flavoring materials and juices may of course be incorporated in the water to impart any desired flavor and taste to the product.

The following specific examples are further illustrative of my invention without however being intended as limitations thereon:

Example A

A dough was prepared by mixing in a power mixer of the usual type, the following materials in the quantities indicated, all parts being by weight.

| Material | Quantity, parts |
| --- | --- |
| Wheat flour | 80 |
| Baking Powder | 5 |
| Salt | 1.5 |
| Powdered Egg Yolk | 10 |
| Water | 80 |

The flour, baking powder, egg yolk and salt are added to the mixing vessel and mixed for a few seconds and then the water is added gradually with continued mixing over a period of about ½ minute and mixing then continued until a smooth homogeneous dough is obtained, which requires about 5 minutes. The dough is then set aside in a warm moist atmosphere, i. e. a temperature of 35° C. and relative humidity of 80% until the dough has doubled in volume, which requires about 2 hours. The raised dough is then kneaded, dusted with flour and extruded in a macaroni press. The tubular strips emerging from the press are steamed with saturated steam for 4 minutes and then hung in a drying oven maintained at a temperature of 50° C. and thus treated until the moisture content has been reduced to 10%. This requires about 6 hours. Determination of moisture content is made by the usual method employed for macaroni and like products.

About ½ lb. of the dried product is placed in a pot and covered with water. The water is heated to boiling, boiling continued for 1 minute, and the contents of the pot then allowed to stand for 5 minutes. The tubular products upon removal are found to have retained their tubular shape and to be tender and palatable.

Example B

Following the procedure described in Example A, a homogeneous dough is prepared from the following ingredients, in the proportions indicated.

| Material | Quantity |
| --- | --- |
| Wheat flour | 2½ cups. |
| A-22 Modified Wheat Starch | ¼ cup. |
| Yeast | 1 cake. |
| Salt | 1½ teaspoons. |
| Shortening | ¼ cup. |
| Scalded Milk | ½ cup. |
| Water | ½ cup. |

As described in Example A, the dough is set aside in a warm, moist atmosphere and allowed to stand until it has approximately doubled in volume. The dough is then kneaded, dusted with flour and pressed through a die to form a plurality of vermicelli-form strips. These strips are hung to dry in a room having a temperature of about 40° C. and left until the moisture content has been reduced to 12%.

A portion of the product when covered with water, boiled for 1 minute and allowed to stand for 6 minutes is found to be tender and palatable and to have retained its form during cooking.

*Example C*

Following the procedure described in Example A, a dough is made from the following ingredients, in the proportions indicated.

| Material | Quantity |
| --- | --- |
| Wheat flour | 2 cups. |
| B-24 Modified Starch | ¼ cup. |
| Double-Acting Baking Powder | 3 teaspoons. |
| Salt | 1 teaspoon. |
| Shortening | ½ cup. |
| Eggs | 2. |
| Milk | ½ cup. |
| Water | 1 cup. |

After mixing, the dough is allowed to stand for about 3 hours during which time it increases in volume by about 300%. The dough is then kneaded, dusted with flour and sheeted by passing it between press rolls. The sheet is cut into strips and the strips hung up to dry in an oven through which air at 50° C. is circulated. Drying is continued until the moisture content has been reduced to about 13%.

A handful of the product is placed in a pot, covered with water and the water brought to boiling. After boiling for 1 minute and standing for 5 minutes, the cooked product upon removal is found to be tender and palatable and to have retained its original shape.

I thus provide an alimentary paste product which may be made from inexpensive ingredients and which may be completely cooked within a few minutes to provide a tender, palatable food product of attractive and appetizing form.

It will be apparent that various changes and modifications may be made without departing from the scope of my invention as defined in the appended claims and it is intended, therefore, that all matter contained in the foregoing description shall be interpreted as illustrative and not in a limiting sense.

What I claim and desire to secure by Letters Patent is:

1. A process of making a hard, brittle, quick-cooking raw food product similar to an alimentary paste product but characterized by a cellular structure comprising at least one-third voids with the starch granules in the flour having their naturally-occurring composition and structure, which comprises forming a mixture comprising at least 60% wheat flour, 5 to 10% of a leavening agent based on the weight of the flour, and sufficient liquid to form a readily moldable dough, mixing said components to form a uniform dough, placing said dough in an atmosphere of 45 to 100% relative humidity and at a temperature of 10 to 40° C., allowing said dough to stand until it has increased in volume by at least 50%, kneading the dough, forming the dough into shapes, steaming the shaped dough and drying the steamed product to a mixture content below 14%.

2. A process of making a hard, brittle, quick-cooking raw food product similar to an alimentary paste product but characterized by a cellular structure comprising at least one-third voids with the starch granules in the flour having their naturally-occurring composition and structure which comprises forming a mixture comprising at least 60% wheat flour, 5 to 10% based on the weight of the flour of a leavening agent, 5 to 15% based on the weight of the flour of a modified starch, and sufficient liquid to form a readily moldable dough, mixing said components to form a uniform dough, placing said dough in an atmosphere favoring the action of said leavening agent, kneading the dough, forming the dough into shapes, steaming the shaped dough and drying the steamed product to a moisture content below 14%.

3. A process of making a hard, brittle, quick-cooking raw food product similar to an alimentary paste product but characterized by a cellular structure comprising at least one-third voids with the starch granules in the flour having their naturally-occurring composition and structure which comprises forming a mixture comprising at least 60% wheat flour, 5 to 10% based on the weight of the flour of a leavening agent, 5 to 15% based on the weight of the flour of a modified starch, and sufficient liquid to form a readily moldable dough, mixing said components to form a uniform dough, placing said dough in an atmosphere of 45 to 100% relative humidity and at a temperature of 10 to 40° C., allowing said dough to stand until it has increased in volume by at least 50%, kneading the dough, forming the dough into shapes, steaming the shaped dough for 3 to 5 minutes and drying the steamed product to a mixture content below 14%.

References Cited in the file of this patent

UNITED STATES PATENTS

| Number | Name | Date |
| --- | --- | --- |
| 874,279 | Anderson | Dec. 17, 1907 |
| 1,727,342 | Goodwin | Sept. 10, 1929 |
| 1,733,574 | Block | Oct. 29, 1929 |

OTHER REFERENCES

Le Clerc: Cereal Chemistry, September 1933, pp. 397, 398, 402.

Jacobs: Food and Food Products, vol. I, Interscience Pub. 1944, p. 676.

Berolzheimer: Encyclopedic Cook Book, Grosset and Dunlap, New York, 1948, page 129.